United States Patent [19]

Bailey et al.

[11] 4,293,124

[45] Oct. 6, 1981

[54] SYSTEM FOR AUTOMATICALLY LOADING PLANAR FILM SHEETS ONTO A FILM POSITIONING DEVICE

[75] Inventors: David C. Bailey, Cocoa Beach; Floyd F. Keesler, Indialantic, both of Fla.

[73] Assignee: Harris Corporation, Melbourne, Fla.

[21] Appl. No.: 936,365

[22] Filed: Aug. 24, 1978

[51] Int. Cl.³ .............................................. B65H 9/10
[52] U.S. Cl. ..................................... 271/233; 271/238
[58] Field of Search ............... 271/233, 234, 236, 238

[56] References Cited

U.S. PATENT DOCUMENTS

| 2,565,054 | 8/1951 | Watrous | 271/236 |
| 3,834,799 | 7/1972 | Blosser | 353/27 |
| 3,908,980 | 9/1975 | Fowler | 271/3 |
| 3,950,095 | 4/1976 | Bouygues | 355/72 |
| 4,023,789 | 5/1977 | Touchette | 271/236 X |

Primary Examiner—Richard A. Schacher
Attorney, Agent, or Firm—Yount & Tarolli

[57] ABSTRACT

A film loader (16), loads a planar film sheet (58), such as a microfiche, onto a vacuum head (54) associated with an X/Y positioner (56). The film sheet is edge supported between slots (106) in two side plates (36, 38), and is transported along the path defined by these slots by driven rollers (40, 110). The vacuum head (54) is positioned at a location transversely adjacent and partially intruding into this film path. Stop pins (62) block the movement of the film sheet beyond this location so that the film sheet comes to stop with an edge (68) resting on the vacuum head. Guide pins (64) are inserted into the film path upstream of this location, and are moved downstream so as to confine the film sheet to a well defined position between the guide pins (64) and the stop pins (62). An actuator (70) forces the film sheet transversely against locator pins (66) which protrude from the vacuum head (54), thus precisely aligning the film sheet (58) onto the vacuum head (54). A plate (154) flattens the film sheet against the vacuum head (54) as a vacuum is applied thereto so that the film sheet is captured by the vacuum head. The stop pins (62) and actuator (70) are then disengaged from the film sheet to permit the film sheet (58) to be positioned by the positioner (56).

10 Claims, 4 Drawing Figures

SYSTEM FOR AUTOMATICALLY LOADING PLANAR FILM SHEETS ONTO A FILM POSITIONING DEVICE

The United States Government has rights in this invention pursuant to contract #F30602-74-C-0152 awarded by the Department of the Air Force.

BACKGROUND AND FIELD OF THE INVENTION

The present invention relates to film handling systems, and more particularly to a system for automatically loading planar film sheets, such as microfiche, onto a film positioning mechanism.

Planer sheets of film, such as microfiche, provide a convenient medium for the bulk storage of information, and have long been used in this capacity. Since the data contained on these microfiche is reduced to very small dimensions, it is necessary that the microfiche be positioned very precisely with respect the optical axis of the optical recording or reading apparatus. Although this could be accomplished manually, considerations of cost and efficiency make it highly desirable to devise mechanisms for performing this function automatically.

In order to accomplish this goal, some means must be provided for first grasping the fiche, and for then positioning the fiche with respect to the optical axis of the recording or reading mechanism. The effectiveness of this method is in large part determined by the precision with which a microfiche can be inserted onto the film grasping device, since the position of the grasping head, itself, may be very precisely controlled by using any number of well known X/Y positioning mechanisms. Loading of the fiche onto the grasping head could, again, be done manually but to do so would in large part defeat the effectiveness of the automatic positioning system. It is therefore necessary to provide an automatic mechanism which is capable of very precisely and reliably loading a microfiche or similar planar film sheet onto a film grasping device.

SUMMARY OF THE INVENTION

It is therefore an object of the present invention to provide an efficient, reliable, and cost-effective system for automatically loading a planar film sheet onto a film holding device.

It is an additional object of the present invention to provide a film loading system which operates to accurately position a planar film sheet at a known position with respect to a film utilization device, such as a film holding device.

It is still another object of the present invention to provide a film loading system for loading a planar film sheet onto a film holding device which utilizes a vacuum to grasp the film therein.

It is even another object of the present invention to provide a system for loading a planar film sheet onto a film holding device from a transporter which transports the film to the film holder from a remote station.

It is another object of the present invention to provide a film loading system which mechanically confines the planar film sheet to a specific location with respect to the film holding device, and which then forces the planar film sheet against the film holding device so that it occupies a known position thereon.

In accordance with the present invention, apparatus is provided for precisely positioning a film sheet at a known location. This apparatus includes transporting means for transporting the film sheet along a film path, and stop means for blocking the path at a first location so as to prevent movement of the film sheet past that first location. In addition, film guide means are provided for contacting the trailing portion of the film sheet after the leading portion has contacted the stop means. The film sheet is thereby confined to a known location along the path.

In accordance with another aspect of the present invention, apparatus is provided for loading planar film sheets onto a film holding device. This apparatus includes transporting means for transporting the film sheets edge-first along a path to a first loading station, and film stop means for blocking the path at the film loading station so as to prevent further forward movement of the film sheet along the path, after the leading edge of the film sheet has contacted the film stop means. Film guide means are provided for contacting the trailing edge of the film sheets after the leading edge has contacted the stop means. The film guide means thereby confines the film sheets to a known location along the path, with this known location being defined by the positions of the film stop means and the film guide means. Film grasping means is provided which is adapted to receive an edge of the film sheet for holding the sheet by that edge, wherein the film grasping means is located at a position transverse to the path, and adjacent to the known position. Finally, means are provided for mechanically contacting the edge of the film sheets in order to force the film sheet in a direction transverse to the path and thus toward the film grasping means, so as to thereby force the edge of the film sheet which is adjacent to the film grasping means into a known orientation relative to the film grasping means. The apparatus thereby operates to accurately align the film sheets with respect to the film grasping means.

In accordance with another aspect of the present invention, the film grasping means is vacuum operated and includes a surface onto which a number of passages open, where a vacuum may be applied to these passages so as to grasp the film applied to this planar surface. The apparatus further incorporates means for flattening the portion of the film sheet which is located over this planar surface against the planar surface as a vacuum is applied thereto. This permits a vacuum seal to be formed between the film sheet and the planar surface.

BRIEF DESCRIPTION OF THE DRAWINGS

The foregoing and other objects and advantages of the present invention will become more readily apparent from the following detailed description, as taken in conjunction with the accompanying drawings, wherein.

DETAILED DESCRIPTION

In the detailed description which follows, the invention will be described in the environment of a system for recording information onto unexposed microfiche film sheets. The invention, however, may broadly be applied to any system wherein a planar film sheet must be automatically and precisely loaded onto a film grasping mechanism. Even more broadly, the disclosed invention may find use in any system requiring accurate positioning of a film sheet for any reason. This would, of course, include most microfiche reading systems as well as many other types of film handling systems.

Figure 1:
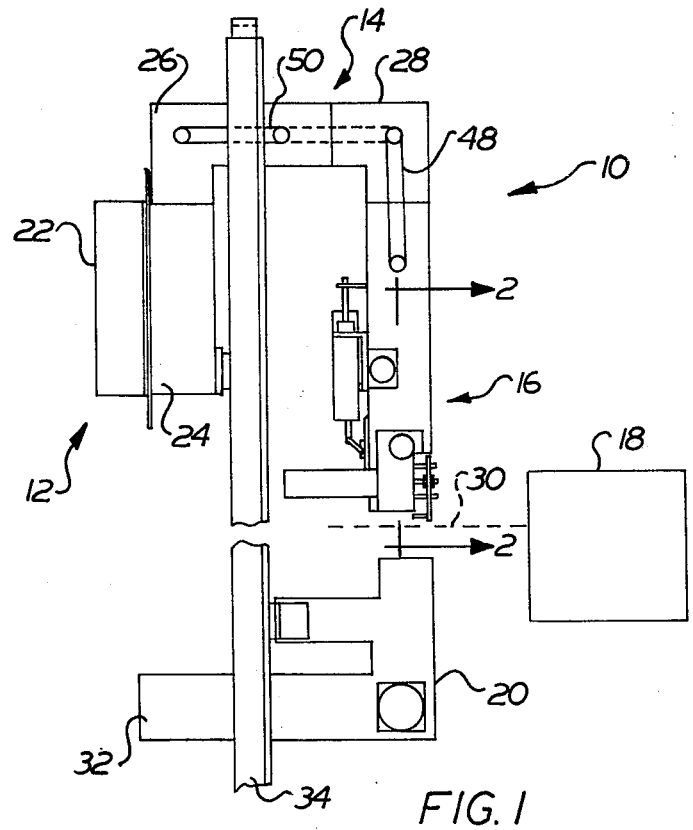
FIG. 1 is an elevation view of a film recording system incorporating a film loading station in accordance with the teachings of the present invention.

A microfiche recording system 10 is generally illustrated in FIG. 1. This recording system generally includes a film source 12, a film transporter 14, a film loading station 16, a film recording station 18, and an exit transport assembly 20. Also included is an X/Y positioning mechanism, not shown in this Figure.

The unexposed microfiche upon which information is to be recorded are supplied to the system from a film source 12. Film source 12 includes a film magazine 22 which will contain a large number of unexposed microfiche film sheets therein. As viewed in this figure, the plane of the stored fiche is essentially perpendicular to the plane of the drawing. A film picker 24 takes the microfiche from the film magazine 22 and feeds them individually into film transporter 14. Film transporter 14 includes two sections 26 and 28, both of which are driven by the motor associated with the film loader station 16. These two film transporting sections 26 and 28 receive the film sheets supplied by film picker 24 and direct them through two right angle turns into the film loading station 16.

Film loading station 16 includes mechanisms, to be described in greater detail hereinafter, for loading the film thus received onto the X/Y positioner (not shown in this Figure). When the fiche has been loaded onto an X/Y positioner, the positioner will be free to move the film to various discrete positions with respect to the optical axis 30 of the film recording station 18. Recording station 18 optically exposes the various discrete locations along the otherwise unexposed microfiche film sheet so as to thereby record the necessary information thereon.

Upon the conclusion of the film recording process, the X/Y positioner positions the exposed microfiche over an opening in the exit transport assembly 20, and then releases it. The exit transport assembly 20 transports the microfiche through another right angle turn to an exit 32. Exit 32 of the microfiche recording system 10 may be located adjacent any conventional film processor so that the exposed fiche may be processed immediately following the recording of data thereon.

The various sections of the film recording system 10 may be attached in any convenient manner to one another and to a frame 34 so as to provide a unified, rigid structure.

Figure 2:
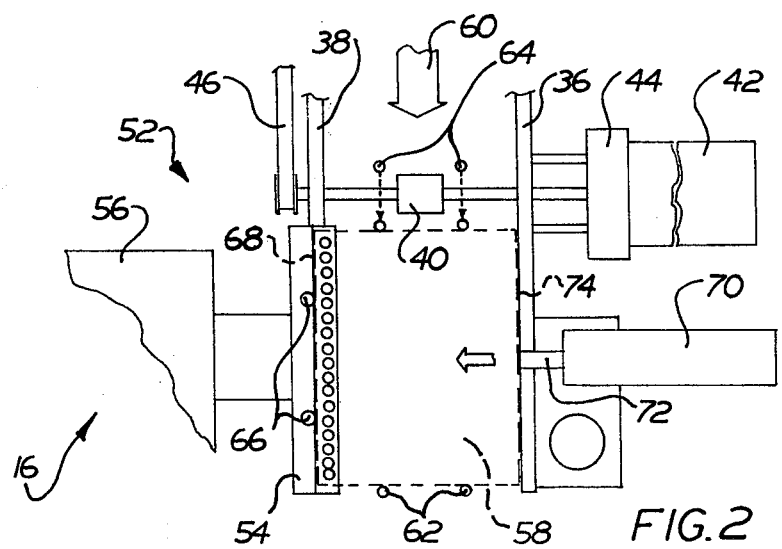
FIG. 2 is a simplified section of the film loading station of FIG. 1.

The film loading station 16, which is the subject of the present invention, is shown in a simplified sectional view in FIG. 2. Film loader 16 includes two side plates 36 and 38 which join corresponding side plates in the film transporter 14. The film is edge-supported by slots in these two parallel plates 36 and 38, and is guided along the film path by these slots. A series of driven rollers cooperate with corresponding pinch rollers to positively drive the film along this path to the film loading station 16. One of the driven rollers 40 within the film loading station 16 is shown in FIG. 2. This roller 40 is directly driven by a motor 42 whose speed is geared down by a gear box 44. The remaining driven rollers are also powered by motor 42, and are coupled thereto by a series of drive belts, including drive belt 46 of FIG. 2 and drive belts 48 and 50 of FIG. 1. The microfiche is thus drawn into the film loading station 16 and enters the film loading area in the direction indicated by arrow 60 of FIG. 2.

As stated previously, the purpose of the film loading station 16 is to receive the film sheets provided by the film transporter 14, and to load these films onto an X/Y positioner. In FIG. 2, the X/Y positioner is generally identified by reference number 52, and includes a vacuum head 54 for grasping the fiche provided to the vacuum head by the film loading station, and a positioner assembly 56 which operates to position the vacuum head, and thus the microfiche grasped therein, in two orthogonal dimensions. These two dimensions define a plane corresponding to the plane of the microfiche.

During the loading of a fiche onto the vacuum head 54, the vacuum head 54 is positioned in a notch at the end of side plate 38, and essentially represents an extension of the groove contained therein so as to provide a continuing path for the microfiche 58. Thus, as the fiche 58 enters the film loader along the path indicated by arrow 60 of FIG. 2, it will be driven by the driven roller 40 onto the vacuum head 54. Motion of the fiche 58 beyond this point is blocked by two retractable stop pins 62 which, at this time, are located in the path of the film sheet. Film guide pins 64, which until now have been held away from the film path, are then inserted into the film path upstream of the microfiche 58, and are moved downstream along the film path until they arrive at a final destination wherein they are separated from stop pins 62 by a distance closely corresponding to the length of the microfiche 58. The microfiche 58 is therefore closely confined between the stop pins 62 and the guide pins 64. These guide pins 64 are necessary since the microfiche 58 may not come to rest precisely against the stop pins 62, and may thus be out of the preferred alignment along the vacuum head 54. If this is the case, the guide pins 64 will, during their travel along the film path, push the microfiche against the stop pins 62 and thus into the desired longitudinal alignment on the vacuum head 54.

The surface of the vacuum head 54 upon which the fiche 58 comes to rest essentially planar, except that two locater pins 66 protrude therefrom. In order for the microfiche to be properly aligned on the vacuum head 54, the edge 68 of the microfiche 58 must abut the locator pins 66. A pneumatic actuator 70 is included in order to force the edge of the fiche into contact with locator pins 66. A rod 72, connected to the piston of pneumatic actuator 70, and passes through the righthand side plate 36 of the loader assembly 16 at a level corresponding to the level of the slot in which the edge 74 of fiche 58 is guided. Thus, when microfiche 58 has been captured between stop pins 62 and guide pins 64, the rod 72 will be located substantially adjacent the edge 74 of the microfiche 58. Extension of the rod 72 from actuator 70 will therefore cause the end of rod 72 to physically contact the edge 74 of microfiche 58, thus causing the opposing edge 68 of microfiche 58 to move towards and be forced against the locater pins 66 associated with the vacuum head 54.

Vacuum head 54 has a large number of small passages 76 formed therein, all of which are connected to a common central passage (not shown). After the fiche has been seated against the locator pins 66, a vacuum will be applied to these passages 76. A mechanical cam (not shown in this figure) then engages the film over the vacuum head 54, and flattens it against the vacuum head so as to form a vacuum seal between the fiche 58 and the head 54. The fiche 58 will thereafter be firmly held against the vacuum head as long as this vacuum seal is maintained. The microfiche 58 will therefore be captured by the vacuum head in a very precise, repeatable alignment.

Following the capture of the microfiche 58 by the vacuum head 54, all of the mechanisms associated with the loader assembly 16 will be disengaged so as to permit free movement of the microfiche 58 by the X/Y positioner 56. Thus, guide pins 64 and stop pins 62 will each be retracted out of the film path, and pneumatic actuator 70 will be actuated so as to disengage the rod 72 from the edge 74 of microfiche 58.

Since the stop pins 62 have been retracted out of the film path of microfiche 58, the positioner assembly 60 may remove the captured microfiche from the loader station 16 by simply moving the vacuum head 54 downwards, (as viewed in FIGS. 1 and 2), and thus into the optical axis 30 of the recorder assembly 18.

Figure 3:
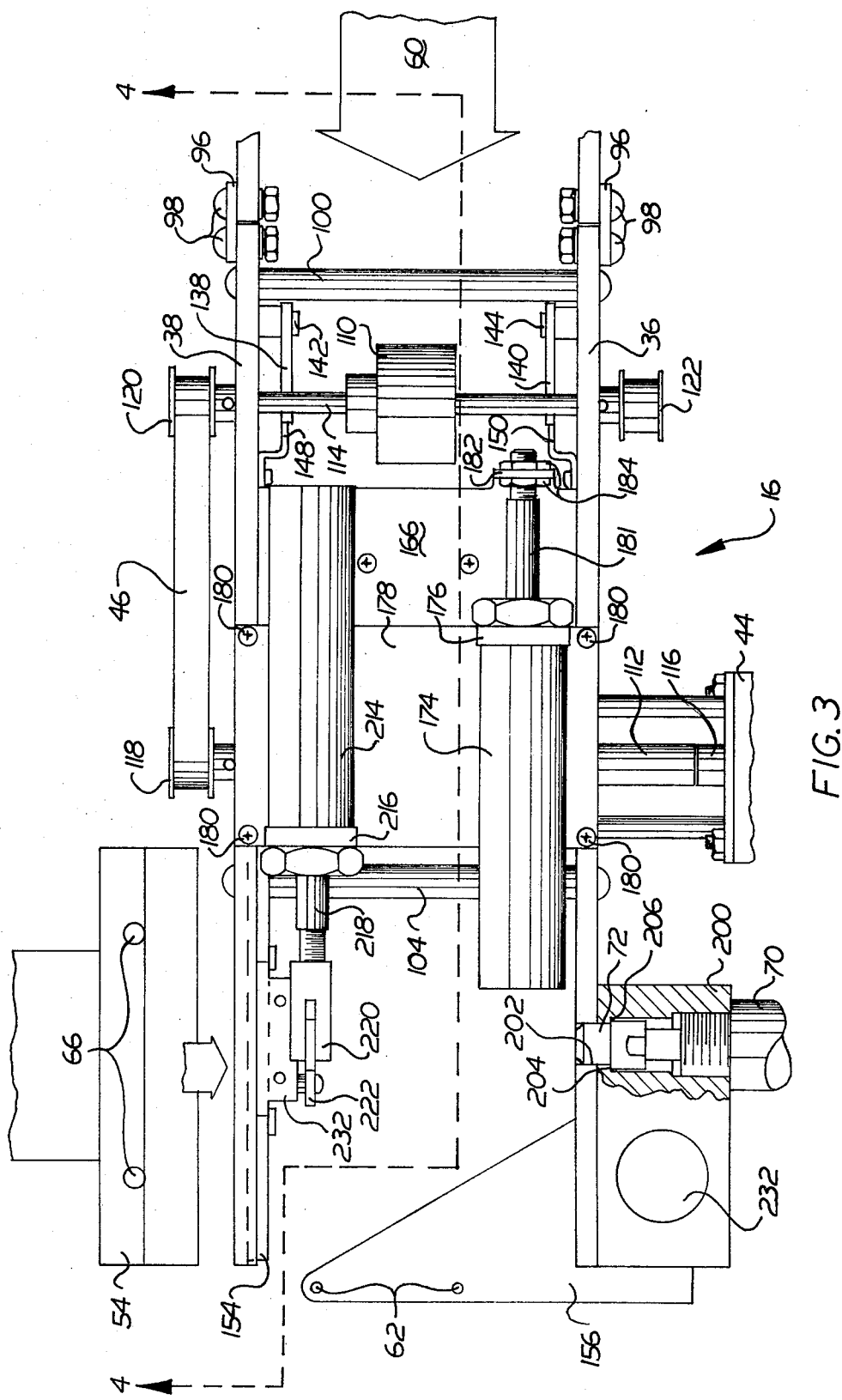
FIG. 3 is a plan view of the film loading station of the system in FIG. 1.
Figure 4:
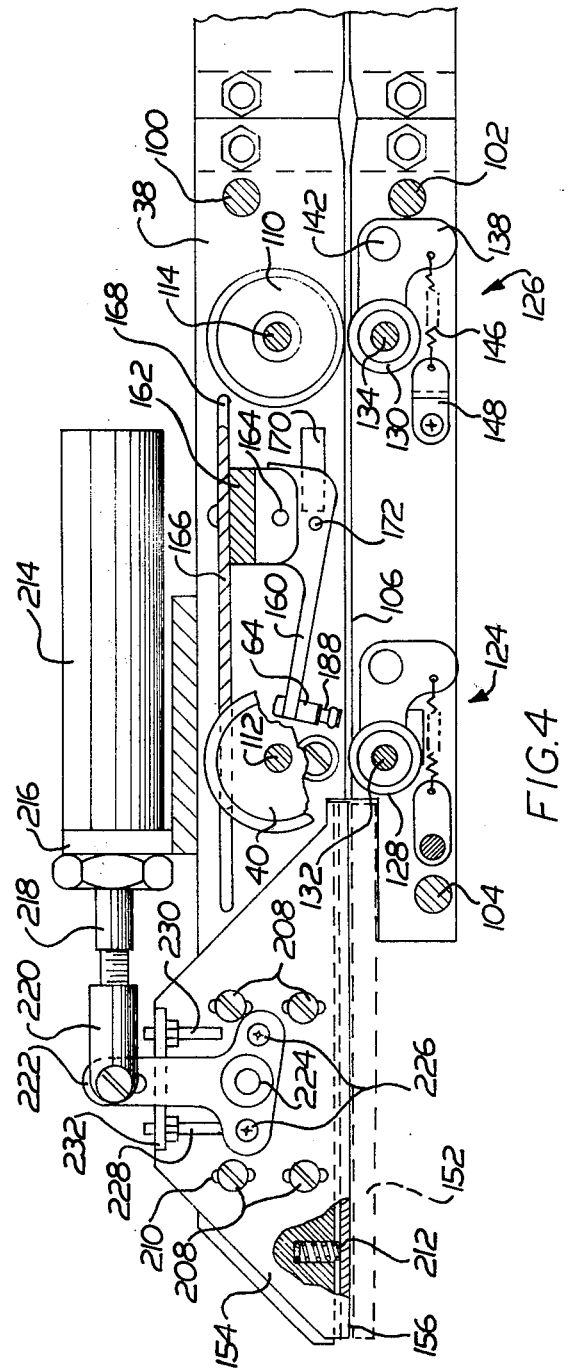
FIG. 4 is a sectional view of the film loading station of FIG. 3.
Figure 5:
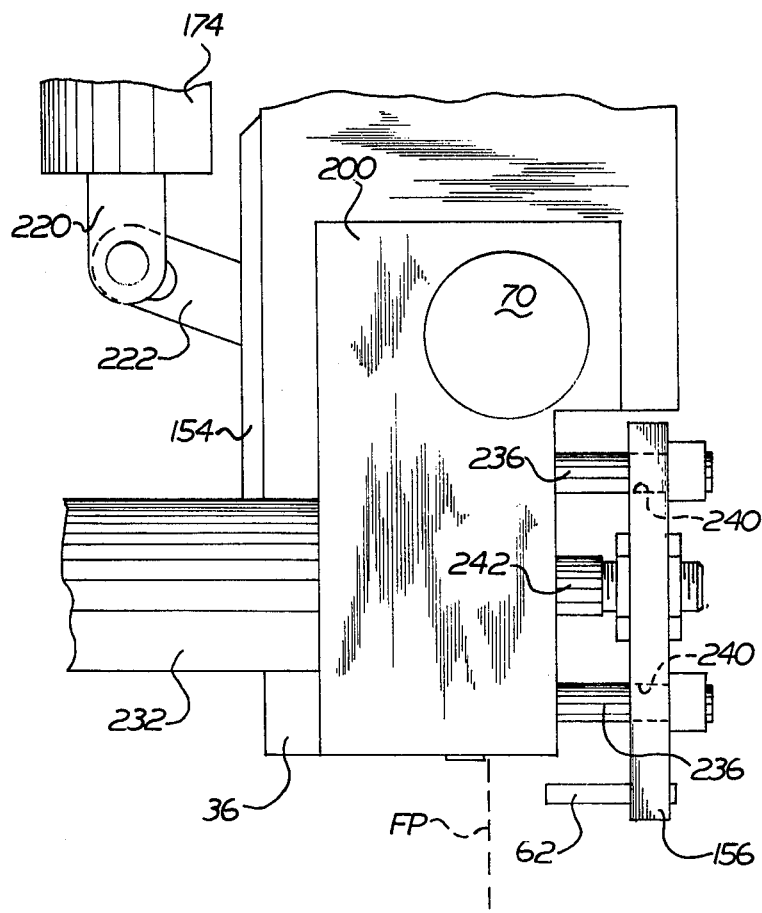
FIG. 5 is an elevation view of a portion of the film loading station of the system of FIG. 1; and, FIG. 6 is a block diagram of a control system for controlling the operation of the film loading station of the system of FIG. 1.

The film loading station 16 is shown in greater detail in FIGS. 3, 4 and 5. For convenience of description, those elements of FIGS. 3, 4 and 5 which corresponding to similar elements of FIG. 2 will be identified by the same reference numerals as in FIG. 2.

In FIGS. 3 and 4 it will be seen that the film loading station has a frame essentially defined by the two side plates 36 and 38. These side plates are rigidly held in an essentially parallel relationship with respect to one another by three spacer bars 100, 102, and 104. As the microfiche enter the film loading station, they are supported along their edges by longitudinal slots 106 (see FIG. 4) in each of the side plates 36 and 38. The spacing between the two side plates 36 and 38 established by the spacer bars 100, 102 and 104 is such that the microfiche edges are closely received by the slots 106.

The film loader station 16 is attached to the film transporter 14 by means of coupling plates 96, best shown in FIG. 3. Each of the coupling plates 96 will be bolted to corresponding side plates of the loader station 16 and the film transporter 14 by appropriate bolts 254. The side plates will be aligned so that the slots 106 in the side plates of the loader station 16 will coincide with the corresponding slots in the side plates of the transporter assembly 14, thus permitting the microfiche to be smoothly transported from one unit to the next.

The microfiche is driven along the path defined by these slots 106 by means of a number of driven rollers which cooperate with corresponding spring-loaded pinch rollers. In addition to the driven roller 40, corresponding to the driven roller 40 shown in FIG. 2, the film loading station also includes a second driven roller 110. Each of the driven rollers 40 and 110 is fixed to a corresponding drive shaft 112 and 114. Each of the drive shafts 112 and 114 is rotatably received within suitable bearings in the side plates 36 and 38. Drive shaft 112 is coaxially connected with the output shaft 116 of gear box 44. The motor 42 (not shown in FIGS. 3 and 4) thus directly drives the shaft 112, and thus the driven roller 40. A belt 46 couples a pulley 118, associated with drive shaft 112, to a pulley 120 associated with drive shaft 114 so that driven roller 110 is also driven by the motor 42. The driven rollers of the film transporter 114 are similarly coupled to the motor 42 by a series of pulley arrangements, best shown in FIG. 1. Motor 42 thus provides the entire motive force necessary to transport the fiche from the film picker 24 through the loader station 16.

Spring loaded pinch roller assemblies are associated with each of the driven rollers so as to hold the microfiche against the driven rollers, and thereby permit positive driving of the microfiche by the driven rollers. The pinch roller assemblies 124 and 126 respectively associated with the driven rollers 40 and 110 are shown in the section illustration of FIG. 4. In this figure, it will be seen that the pinch roller assembly 126 includes a pinch roller 130, suitably mounted on a corresponding shaft 134. This shaft 134 is rotatably mounted at either end on corresponding pivot arms 138 and 140, best seen in FIG. 3. Each of the pivot arms 138 and 140 is in turn mounted on a corresponding pivot 142 and 144. The pivot arms 138 and 140 are free to rotate about the pivots 142 and 144, so that the pinch roller 130 can move into and out of engagement with the driven roller 110. The pinch roller 130 is spring biased against the driven roller 110 by means of two springs 146 located at either end of the shaft 134. Each of these springs is coupled between one of the pivot arms 138 or 140 and a corresponding bracket 148 or 150. Pinch roller assembly 124 is constructed similarly to pinch roller assembly 126, and thus will not be described separately.

Thus, a microfiche is fed to the loading station 16 from the film transporter 14, it will be transported through the film loader assembly by the driven rollers 110 and 40, operating in conjunction with a corresponding pinch rollers 134 and 132. The film will therefore be transported in a leftward direction as viewed in FIGS. 3 and 4, past the driven rollers 40, and thus into the area in which the film is to be received by the vacuum head 54.

It should be noted that, althought the slot 106 in the side plate 36 extends the full length of the film loading station, the slot 106 in the side plate 38 is interrupted by a open area 152 in the side plate 38, which permits the vacuum head 54 to be inserted therein. During the period of time in which the microfiche is being fed into the film loading station, the vacuum head 54 will have been precisely positioned within this open area 152 by the X/Y positioner mechanism 56. Thus, the upper surface of the vacuum head 54 will cooperate with the folded over lower surface of a plate 154 to form a continuation of the slot 106 in the side plate 136. The microfiche will thus continue past the driven roller 40 and onto the vacuum head 54 until arriving at the stop pins 62, shown in FIG. 3. These stop pins are attached to a triangularly shaped plate 156 which, as will be described more fully hereinafter, is movable so that the pins 62 may be inserted into, or removed from interference with the motion of the film along the path defined by the grooves 106 in the side plates 36 and 38. When a microfiche is being loaded onto the vacuum head 54, this plate will be in such a position so that stop pins 62 will block the passage of the microfiche beyond that position. The microfiche will therefore come to a halt at or near the stop pins 62.

Upon this occurrence, two guide pins 64 will be inserted into the film path upstream of the microfiche, and will then be brought into a position substantially adjacent to trailing edge of the microfiche. Each of the guide pins 64 is attached to a corresponding pivot arm 160. These pivots arms are each, in turn, pivotably mounted to a corresponding pivot bracket 162 at an axis 164. The pivot brackets 162 are attached to a slide plate 166 which extends across the gap between the side plates 36 and 38, and which is carried by corresponding slots 168 in the side plates. These slots permit the slide plate 166, and thus the pins 64, to be moved upstream or downstream along the film path. Two cam blocks 170 are provided, each rigidly attached to a corresponding side plates 36 or 38, in order to insert the pins into, or retract them from the film path. As the slide plate 66 is moved to the rightward (upstream), as viewed in FIG. 4, a pin 172 in the pivot arm 160 contacts the cam block 170, causing the pivot arm 160 to be rotated clockwise about the axis 164 and the pin 64 to be raised out of the film path. Conversely, as the slide plate 166 is moved to the leftward (downstream), as viewed in FIG. 4, the cam block permits the pivot arm 160 to rotate in a counterclockwise direction, thus inserting the guide 64 into the film path while at the same time moving it downstream towards the microfiche positioned against the vacuum head 54. The pivot arms 160 are resiliently biased towards a "down" position by a spring, not shown in these figures.

The movement of slide plate 166 within the slots 168 in side plates 36 and 38 is controlled by a dual-acting pneumatic actuator 174, best seen in FIG. 3. This dual-acting pneumatic actuator is attached by a bracket 176 to a mounting plate 178 which spans the side plates 36 and 38. The mounting plate 178 is suitably attached to the side plates by means of screws 180. Actuator 174 has a shaft 181 which is connected to the piston thereof. This shaft is also attached to a bracket 182 associated with the slide plate 166 by means of nuts 184. Movement of the slide plate 166 within the slots 168 may therefore be accomplished by controlling actuator 174 to cause retraction or extension of the shaft 180 from the actuator 174. When actuator 174 is operated so that the shaft 180 is in an extended position, the slide plate 166 will be in the rightward position, shown in FIG. 4, and the film guides 64 will be retracted out of the film path. After the microfiche has passed beyond the driven roller 40 and onto the vacuum head 54, the actuator 172 will be actuated so as to retract the shaft 180, thus causing the slide plate 166 to move leftward, as viewed in FIG. 4. The guide pins 64 will thus be extended into the path of the film, and will then move downstream along the film path until the shaft 181 is in a fully retracted position. The point of attachment of shaft 181 to bracket 182 will be adjusted so that, when shaft 181 is fully retracted, the distance separating the center of the notches 188 in the film guides 64 from the stop pin 62 will closely correspond to the length of the microfiche, as measured along the direction of travel of the microfiche along the film path. As noted previously with reference to FIG. 2, this operation insures that the microfiche will occupy a known position along the film path, immediately adjacent the stop pins 62.

This is not to say, however, that the position of the fiche will also be precisely defined in a direction transverse to the film path. In order to prevent the microfiche from hanging up on the locator pins 66 of vacuum head 54 when the fiche is first fed onto the head, it will be necessary to space the head 54 so that pins 66 are slightly back of the slot 106 in side plate 38. It is therefore necessary to include some means for forcing the fiche against the locating pins 66, once the fiche is otherwise correctly positioned.

To this end, a second pneumatic actuator 70 is provided having a shaft 72 attached to the piston thereof. The actuator 70 is carried on a mounting block 200 which, in turn, is mounted onto the side plate 36 of the film loader station 16. The shaft 72 is received within a correspondingly shaped passage 202 in side plate 36. The orientation of the passage 202 with respect to the side plate 36 is such that the it interrupts the slot 106 in the side plate 36. Shaft 72 will normally be retracted within the passage 202 so that the shaft 72 will not interfere with the passage of the microfiche along the groove 106. In order to prevent the film from hanging up upon the opening to the groove 106 on the downstream (leftward, as seen in FIG. 3) side of the passage to 202, this opening will be essentially teardrop shaped. The teardrop shape of this opening will serve to guide the leading edge of the microfiche into the groove 106 on the opposite side of the passage 202. In FIG. 3, the assembly is shown with the shaft 72 in the extended position. The amount of the extension of shaft 72 into the groove 106 in the side plate 36 is determined by a shoulder 204 thereon. A correspondingly shaped shoulder 206 is provided in the mounting block 200 so that, when the shaft 72 is extended, the shoulders 204 and 206 will abut one another. This prevents further extension of the shaft, and fixes the amount by which shaft 72 extends into the passage 202.

In FIG. 3, the vacuum head 54 is shown in a position wherein it is withdrawn from the slot 152 in the side plate 38. During the loading process, of course, this vacuum head 54 will instead occupy the position generally shown in FIG. 2, wherein the mounting pins 66 are only slightly retracted from the line formed by the slot 106 in the side plate 38. In order to force the edge of the fiche against the locating pins 66, the actuator 70 will be operated to cause the shaft 72 to contact the edge of the microfiche, forcing it towards the vacuum head 54. The microfiche will therefore be forced against the locating pins 66, and slightly flexed thereagainst. This will insure that the microfiche will be in a very precise, well defined position with respect to the vacuum head 54.

A vacuum will then be applied to passages 76 associated with the vacuum head 54, so that the microfiche will be captured thereby. As can be seen in FIG. 4, the present invention contemplates the inclusion of a mechanical cam for flattening the edge of the microfiche against the vacuum head. This will promote a rapid and reliable capture of the fiche by the vacuum head. This mechanical cam consists of a plate 154 having a folded over lower edge 156. The plate 154 is slidably mounted to the side plate 38 by means of four mounting screws 208. As can be seen in FIG. 4, the holes in the plate 154 which receive the machines screws 208 are oblong shaped so that the plate 154 may slide up and down. The cam 154 will be biased towards a "down" position by several springs 212 which are received within cavities within the side plate 38, and which act between the side plate 38, and the folded over lower edge 156 of the plate 154. Although only one of these springs 212 is shown in FIG. 4, it will be appreciated that another spring is located to the rightward side of the mounting screws 208 so that the springs provide an even load upon the plate 154.

Raising and lowering of the plate 154 is accomplished by another dual-acting pneumatic actuator, mounted onto the plate 178 by means of a bracket 216. The shaft 218 associated with a piston of actuator 214 carries a bracket 220 to which a pivot arm 222 is mounted. This pivot arm 222 is rotatably attached via an axis 224 to the side plate 38, through an oblong shaped opening in the plate 154. The rotation of the pivot arm 222 around this axis 224 is therefore controllable by controlling the extension and retraction of the actuator 214. Pivot arm 226 has cam pins 226 attached thereto which coact with corresponding cam followers 228 and 230 to move the plate 154 up and down in response to the operation of actuator 214. Thus, when actuator 214 is actuated so that shaft 218 is retracted, the pivot arm 222 will be in the position shown, with the leftward cam pin 226 in contact with the cam follower 228. The film guide 154 will thus be in a raised position. When the actuator 214 is operated so that the shaft 218 is extended, on the other hand, the cam pin 226 will release cam follower 228, permitting the lower surface 156 of plate 154 to press down against the fiche, thereby flattening it against the surface of the vacuum holder 54. As the actuator 214 approaches full extension, however, the other of the two cam pins 226 will contact the cam follower 230, thus causing the plate 154 to again lift off of the vacuum holder 54.

In this figure, cam followers 228, 230 are formed by set screws which are tapped into a bracket 232 associated with the film guide 154. Preferably, set screws 228 and 230 will be set to contact the cam pins 226 at different heights. Thus, set screw 228 will be adjusted so that, when actuator 214 is fully retracted prior to capture of the fiche, the folded lower surface 156 of plate 154 will be only slightly higher than the groove 106 in the side plate 38. This lower surface 156 therefore provides a guide for the fiche, as the fiche is inserted onto the vacuum head. Set screw 230, on the other hand, will be adjusted to be somewhat lower than set screw 228 so that the film guide 154 will be raised to a higher position when the actuator 214 has been operated to its opposite (extended) position. This will permit sufficient clearance between the captured fiche and surface 156 that there is little danger of contact therebetween when the fiche is removed from the loading station.

Following the capture of the microfiche by the vacuum head 54, the mechanisms associated with the film loader 16 must be disengaged so as to permit the microfiche positioner 56 to position the microfiche with respect to the optical axis. Thus, some means must be provided to retract stop pins 62 into noninterferring positions.

In the illustrated embodiment, the stop pins 62 are withdrawn from the film path by lowering the plate 156 associated therewith until the pins 62 are no longer within the plane of the microfiche. Thus, as can be seen best in FIG. 5, another dual-acting pneumatic actuator 232 will be provided, also mounted to mounting block 200, with its shaft 242 attached to the plate 156 to which the stop pins 62 are affixed. Mounting block 200 carries two guide rails 236 which are received by correspondingly shaped guide passages 240 within the plate 156. Movement of the guide pins 62 into and out of the plane of the film path (FP) is thus accomplished by extending or retracting the shaft 242 associated with the piston of actuator 232. The precise positioning of the stop pins 62 at the desired point along the film path is assured by the guide rails 236.

Figure 6:
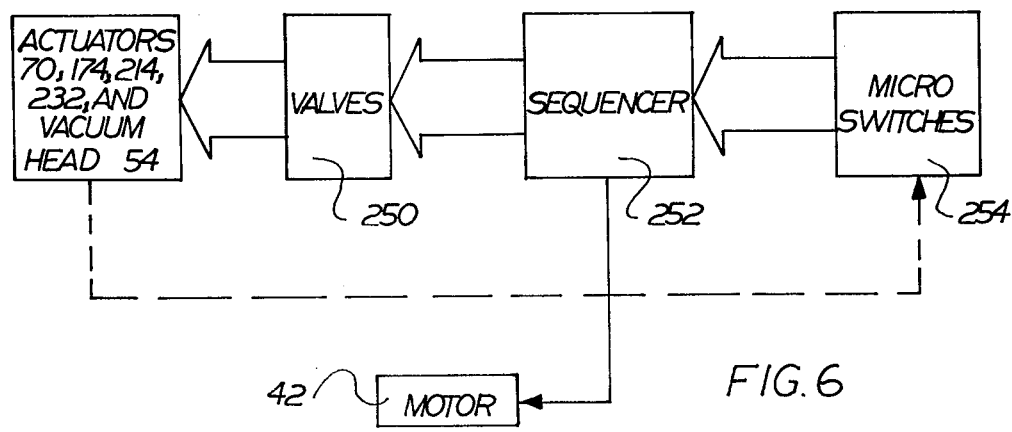

A broad block diagram of a system for controlling the operation of film loading station 16 is shown in FIG. 6. It will be noted that the loader station 16 is entirely operated by means of motor 42, in conjunction with the four pneumatic actuators 70, 174, 214, and 232, and the vacuum head 54. Although not shown in the figures, it will be appreciated that two pressure lines are attached to each of the pneumatic actuators, with these lines controlling the pressure to the chambers on either side of the pistons associated with the actuators. Extension or retraction of these actuators is therefore accomplished by applying appropriate pneumatic pressure to one pressure line, while venting the other. In order to provide electrical control of the operation of these actuators, electrically actuated valves 250 will be associated with each of the pressure lines so as to control the venting or supply of pressure thereto. In addition, each of the actuators will have limit switches 254 associated therewith for monitoring the position of the associated actuator, with other microswitches being located along the path of the microfiche in order to monitor progress of the fiche along the film path. Operation of the entire loading station is electronically controlled by an electronic sequencer 252, which automatically controls the operation of the various elements in response to the signals provided by these switches, so that the proper sequence of events takes place.

This sequence of events may be briefly summarized as follows. First, the various actuators will be placed in their initial positions, and the vacuum head 54 will be inserted into the notch 152 in the side plate 38, in preparation for receipt of the microfiche. The film picker 24 (FIG. 1) will then be operated so as to retrieve an unexposed microfiche from the film magazine 22, and load it into the transporter 14. The motor 42 will be energized so as to transport this fiche into the loader station 16, past rollers 110 and 40. The microfiche will thus come to rest over the vacuum head 54, adjacent stop pins 62. A microswitch along the path of the microfiche adjacent driven roller 40 will indicate when the microfiche has gone beyond this point in the film path. Upon the microfiche clearing this point in the film path, actuator 174 will be energized so as to retract the shaft 180 therein. This will cause the slide plate 166 to move leftward, as viewed in FIG. 4, causing the film guide pins 64 to be inserted into the path of the microfiche and to move downstream along the film path so that the microfiche is snugged up between the film guides 64 and the stop pins 62. When the microswitch associated with actuator 174 indicates that the piston is fully retracted, actuator 70 will be actuated so as to force the microfiche transversely to the film path, against film locator pins 66 on the vacuum head 54. Again, a microswitch associated with actuator 70 will indicate when this motion has been accomplished.

At this time, a valve associated with the vacuum head 54 will be energized so as to supply a vacuum thereto. At the same time, actuator 214 will be energized so as to cause the shaft 218 to extend, thus providing a camming action which permits the plate 154 to momentarily flatten the edge of the microfiche against the vacuum head. When the microswitch associated with actuator 214 indicates that this action has been completed, the level of pressure within the vacuum lines feeding the vacuum head 54 will be monitored to determine whether or not a vacuum seal has been established between the fische and the vacuum head. If not, the actuator 214 will be retracted, and then reextended so as to repeat the attempt to capture the microfiche by the vacuum head. If, after three attempts, a vacuum still has not been established, a failure indication will be provided to the operator. Normally, of course, a vacuum seal will be established, and the sequence will proceed. In this event, the actuator 70 will be retracted so as to disengage it from the edge of the microfiche, and the actuator 232 will be energized so as to remove the pins 62 from the path of the microfiche. This releases the microfiche from the loading station. The X/Y positioner will thus be free to position the microfiche, as required, with respect to the optical axis of the recording assembly 18.

Although the invention has been described with respect to a preferred embodiment, it will be appreciated that various rearrangements and alterations of the parts may be made without departing from the spirit and scope of the present invention, as defined in the appended claims.

What is claimed is:

1. Apparatus for precisely positioning a planar film sheet at a known location, comprising: transporting means for transporting said film sheet along a film path; film stop means for blocking said path at a first location so as to prevent movement of said film sheet past said first location; film guide means for contacting the trailing portion of said film sheet after the leading portion has contacted said stop means so as to thereby confine said film sheet to a known location along said path; film locator means located transversely adjacent said known location; means for mechanically contacting said film sheet so as to force said film sheet transversely against said film locator means, whereby said apparatus precisely positions said film sheet precisely in two dimensions; film holding means for grasping said film sheet after said film sheet has been positioned; means for positioning said film holding means; and means for disengaging said film stop means, film guide means, and film contacting means from said film sheet after said film sheet has been grasped by said film holding means, so as to thereby permit said film sheet to be withdrawn by said positioning means; wherein said film holding means has a planar surface adapted to receive a portion of said film sheet, said holding means including means for applying a vacuum between said surface and said portion of said film sheet and further wherein said apparatus includes cam means for forcing said portion of said film against said surface so that said portion of said film sheet will be held firmly against said surface of said film holding means by said vacuum.

2. Apparatus as set forth in claim 1, wherein said film guide means includes first means to be inserted into said film path for contacting said trailing portion of said film sheet, and second means for holding said first means out of said film path until said film sheet has contacted said stop means and for then inserting said first means into said film path and moving said first means downstream along said film path towards said film sheet.

3. Apparatus as set forth in claim 2, wherein said second means includes means for moving said first means downstream along said film path to a position which is spaced apart from said film stop means by a distance closely corresponding to the dimension of said film sheet between said leading and trailing portions, whereby said film sheet is closely received between said first means and said film stop means.

4. Apparatus as set forth in claim 1, wherein said means for mechanically contacting said film sheet to force said sheet against said film locator means comprises means for forcing said film sheet against said film locator means to such an extent that said film sheet is flexed slightly thereagainst.

5. Apparatus as set forth in claim 1, wherein said film locating means is attached to, and thus moves with said film holding means.

6. Apparatus as set forth in claim 1, wherein said cam means comprises a cam plate having a substantially planar cam surface and means for pressing said cam surfaces against said portion of said film so as to force said portion against said planar surface of said film holding means.

7. Apparatus for loading planar film sheets onto a film holding device, comprising:
    transporting means for transporting one of said film sheets edge-first along a path to a film loading location, whereby a first edge of said transported film sheet leads the passage of said sheet along said path, a second edge, opposed to said first edge, trails the passage of said sheet along said path, and third and fourth opposed edges extend transversely between said first and second edges and thus extend generally along said path;
    film stop means for blocking said path at said film loading location so as to prevent further forward movement of said film sheet along said path after said first edge of said film sheet has contacted said film stop means;
    film guide means for contacting said second edge of said film sheet after said first edge has contacted said stop means so as to thereby confine said film sheet to said film loading location along said path, said location being defined by the positions of said film stop means and said film guide means;
    film holding means adapted to receive said third edge of said film sheet for holding said sheet by said third edge, said means being located at a position transverse to said path and adjacent said film loading position;
    means for mechanically contacting said fourth edge of said film sheet in order to force said film sheet in a direction transverse to said path and towards said film holding means so as to thereby force said third edge of said film sheet adjacent said film holding means into a known orientation relative to said film holding means, whereby said apparatus operates to accurately align said film sheets with respect to said film holding means.

8. Apparatus for loading planar film sheets onto a film holding device, comprising:
    transporting means for transporting one of said film sheets edge-first along a path to a film loading location, whereby a first edge of said transported film sheet leads the passage of said sheet along said path, a second edge, opposed to said first edge, trails the passage of said sheet along said path, and third and fourth opposed edges extend transversely between said first and second edges and thus extend generally along said path;
    film stop means for blocking said path at said film loading location so as to prevent further movement of said film sheet along said path after said first edge of said film sheet has contacted said film stop means;
    film guide means for contacting said second edge of said film sheet after said first edge has contacted said stop means so as to thereby confine said film sheet to said film loading location along said path, said location being defined by the positions of said film stop means and said film guide means;

film holding means adapted to receive said third edge of said film sheet for holding said sheet by said third edge, said means being located at a position transverse to said path and adjacent said film loading position;

means for mechanically contacting said fourth edge of said film sheet in order to force said film sheet in a direction transverse to said path and towards said film holding means so as to thereby force said third edge of said film sheet adjacent said film holding means into a known orientation relative to said film holding means, whereby said apparatus operates to accurately align said film sheets with respect to said film holding means; and means for positioning said film holding means into said position transverse to said path for receiving said planar film sheets, and for thereafter positioning said film holding means so as to precisely position said film sheet relative to a film utilization means.

9. Apparatus as set forth in claim 8, wherein said film stop means are retractable to a position out of said film path, whereby said positioning means may remove said film sheet from said film loading location by carrying said film sheet along said film path downstream of said location.

10. Apparatus for loading planar film sheets onto a film holding device, comprising:

transporting means for transporting one of said film sheets edge-first along a path to a film loading location, whereby a first edge of said transported film sheet leads the passage of said sheet along said path, a second edge, opposed to said first edge, trails the passage of said sheet along said path, and third and fourth opposed edges extend transversely between said first and second edges and thus extend generally along said path;

film stop means for blocking said path at said film loading location so as to prevent further forward movement of said film sheet along said path after said first edge of said film sheet has contacted said film stop means;

film guide means for contacting said second edge of said film sheet after said first edge has contacted said stop means so as to thereby confine said film sheet to said film loading location along said path, said location being defined by the positions of said film stop means and said film guide means;

film holding means adapted to receive said third edge of said film sheet for holding said sheet by said third edge, said means being located at a position transverse to said path and adjacent said film loading position;

means for mechanically contacting said fourth edge of said film sheet in order to force said film sheet in a direction transverse to said path and towards said film holding means so as to thereby force said third edge of said film sheet adjacent said film holding means into a known orientation relative to said film holding means, whereby said apparatus operates to accurately align said film sheets with respect to said film holding means; and wherein said film holding means has a planar surface adapted to receive a portion of said film sheet, said holding means including means for applying a vacuum between said surface and said portion of said film sheet and further wherein said apparatus includes cam means for forcing said portion of said film against said surface so that said portion of said film sheet will be held firmly against said surface of said film holding means by said vacuum.

* * * * *